United States Patent
Chen et al.

(10) Patent No.: US 10,904,577 B2
(45) Date of Patent: Jan. 26, 2021

(54) VIDEO COMPRESSION SYSTEM WITH POST-PROCESSING OF BITSTREAM GENERATED BY HARDWARE VIDEO ENCODING AND ASSOCIATED VIDEO COMPRESSION METHOD

(71) Applicant: MEDIATEK INC., Hsin-Chu (TW)

(72) Inventors: Li-Heng Chen, Hsinchu (TW); Chung-Hua Tsai, Hsinchu (TW); Tung-Hsing Wu, Hsinchu (TW); Lien-Fei Chen, Hsinchu (TW); Yu-Kun Lin, Hsinchu (TW); Yi-Hsin Huang, Hsinchu (TW); Han-Liang Chou, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/194,396

(22) Filed: Nov. 19, 2018

(65) Prior Publication Data

US 2019/0246144 A1     Aug. 8, 2019

Related U.S. Application Data

(60) Provisional application No. 62/627,264, filed on Feb. 7, 2018.

(51) Int. Cl.
*H04N 19/184* (2014.01)
*H04N 19/85* (2014.01)
*H04N 19/70* (2014.01)

(52) U.S. Cl.
CPC .......... *H04N 19/85* (2014.11); *H04N 19/184* (2014.11); *H04N 19/70* (2014.11)

(58) Field of Classification Search
CPC ....... H04N 19/184; H04N 19/70; H04N 19/85
See application file for complete search history.

(56) References Cited

U.S. PATENT DOCUMENTS

| | | | |
|---|---|---|---|
| 2014/0092991 A1* | 4/2014 | Sullivan | H04N 19/46 375/240.26 |
| 2015/0304665 A1* | 10/2015 | Hannuksela | H04N 19/70 375/240.02 |

FOREIGN PATENT DOCUMENTS

| | | |
|---|---|---|
| TW | 200707986 | 2/2007 |
| TW | 200939781 | 9/2009 |

* cited by examiner

*Primary Examiner* — Sath V Perungavoor
*Assistant Examiner* — Tyler B Edwards
(74) *Attorney, Agent, or Firm* — Winston Hsu

(57) ABSTRACT

A video compression system includes a video encoder and a bitstream processing circuit. The video encoder is hardware that performs hardware video encoding upon frames to generate a first bitstream. The first bitstream is output from an entropy encoding circuit of the video encoder. The bitstream processing circuit performs a bitstream post-processing operation upon the first bitstream to produce a second bitstream that is different from the first bitstream, and outputs the second bitstream as a compression output of the frames.

20 Claims, 12 Drawing Sheets

VIDEO COMPRESSION SYSTEM WITH POST-PROCESSING OF BITSTREAM GENERATED BY HARDWARE VIDEO ENCODING AND ASSOCIATED VIDEO COMPRESSION METHOD

CROSS REFERENCE TO RELATED APPLICATIONS

This application claims the benefit of U.S. provisional application No. 62/627,264, filed on Feb. 7, 2018 and incorporated herein by reference.

BACKGROUND

The present invention relates to video compression, and more particularly, to a video compression system with post-processing of a bitstream generated by hardware video encoding and an associated video compression method.

The conventional video coding standards generally adopt a block based coding technique to exploit spatial and temporal redundancy. For example, the basic approach is to perform intra prediction/inter prediction on each block, transform residues of each block, and perform quantization and entropy encoding. Besides, a reconstructed frame is generated to provide reference pixel data used for coding blocks in following frames. For certain video coding standards, in-loop filter(s) may be used for enhancing the image quality of the reconstructed frame. In one possible implementation, video encoding may be achieved by using hardware only. For example, a hardware video encoder is used for performing a video encoding operation upon a plurality of frames of an input video sequence to generate an output bitstream, where the hardware video encoder is implemented by dedicated hardware. Since the dedicated hardware is fixed, the output bitstream generated from the hardware video encoder meets a predetermined coding requirement (e.g., one inter-prediction reference frame structure) only. If the output bitstream is required to meet another coding requirement (e.g., another inter-prediction reference frame structure), re-design of the hardware video encoder is needed. As a result, the production cost and the time to market will be increased inevitably.

SUMMARY

One of the objectives of the claimed invention is to provide a video compression system with post-processing of a bitstream generated by hardware video encoding and an associated video compression method.

According to a first aspect of the present invention, an exemplary video compression system is disclosed. The exemplary video compression system includes a video encoder and a bitstream processing circuit. The video encoder is hardware arranged to perform hardware video encoding upon a plurality of frames to generate a first bitstream, wherein the first bitstream is output from an entropy encoding circuit of the video encoder. The bitstream processing circuit is arranged to perform a bitstream post-processing operation upon the first bitstream to produce a second bitstream that is different from the first bitstream, and output the second bitstream as a compression output of the plurality of frames.

According to a second aspect of the present invention, an exemplary video compression method is disclosed. The exemplary video compression method includes: performing, by a video encoder, hardware video encoding upon a plurality of frames to generate a first bitstream, wherein the video encoder is hardware arranged to perform the hardware video encoding, and the first bitstream is output from an entropy encoding circuit of the video encoder; performing a bitstream post-processing operation upon the first bitstream to produce a second bitstream that is different from the first bitstream; and outputting the second bitstream as a compression output of the frames.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
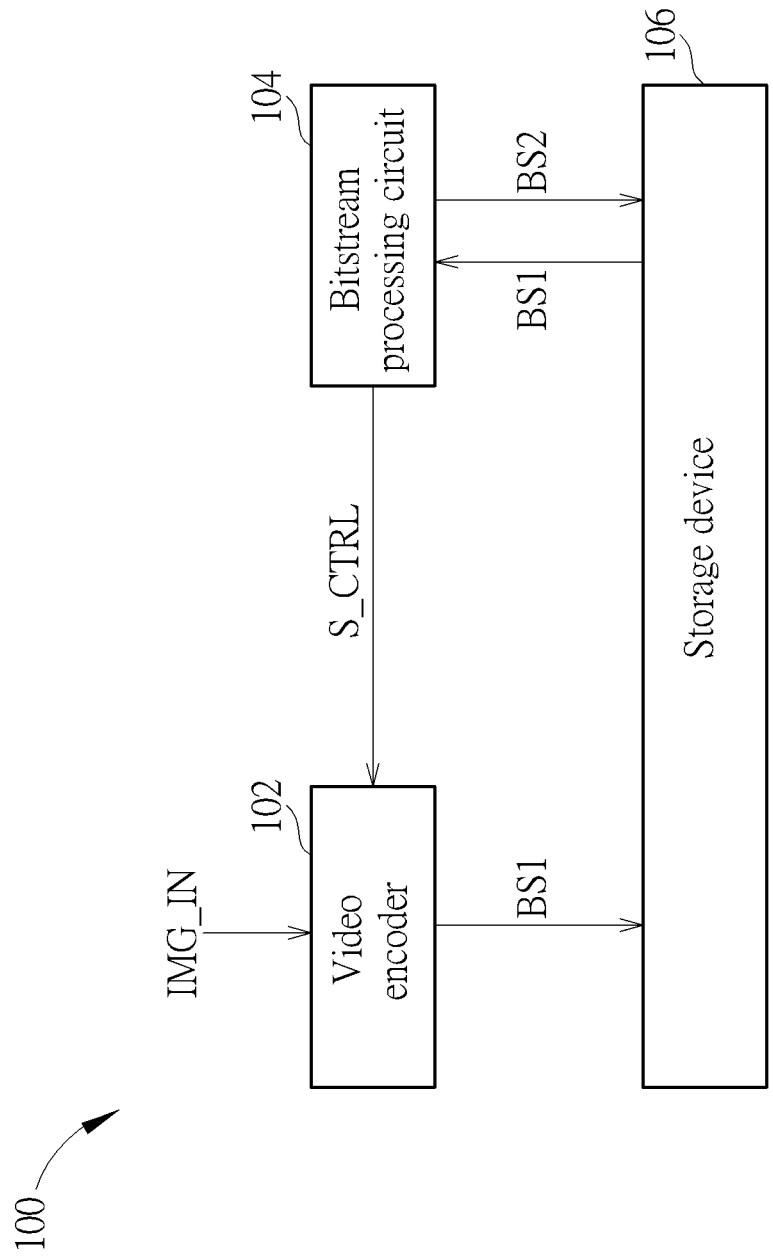
FIG. 1 is a diagram illustrating a video compression system according to an embodiment of the present invention.

FIG. 1 is a diagram illustrating a video compression system according to an embodiment of the present invention. The video compression system 100 includes a video encoder 102, a bitstream processing circuit 104, and a storage device 106. In this embodiment, the video encoder 102 is a hardware video encoder arranged to perform hardware video encoding. For example, the video encoder 102 is dedicated hardware arranged to perform hardware video encoding upon a plurality of frames IMG_IN to generate a first bitstream BS1. The video encoder 102 has encoder architecture complying with a coding standard. By way of example, but not limitation, the video encoder 102 may be an H.264 video encoder.

Figure 2:
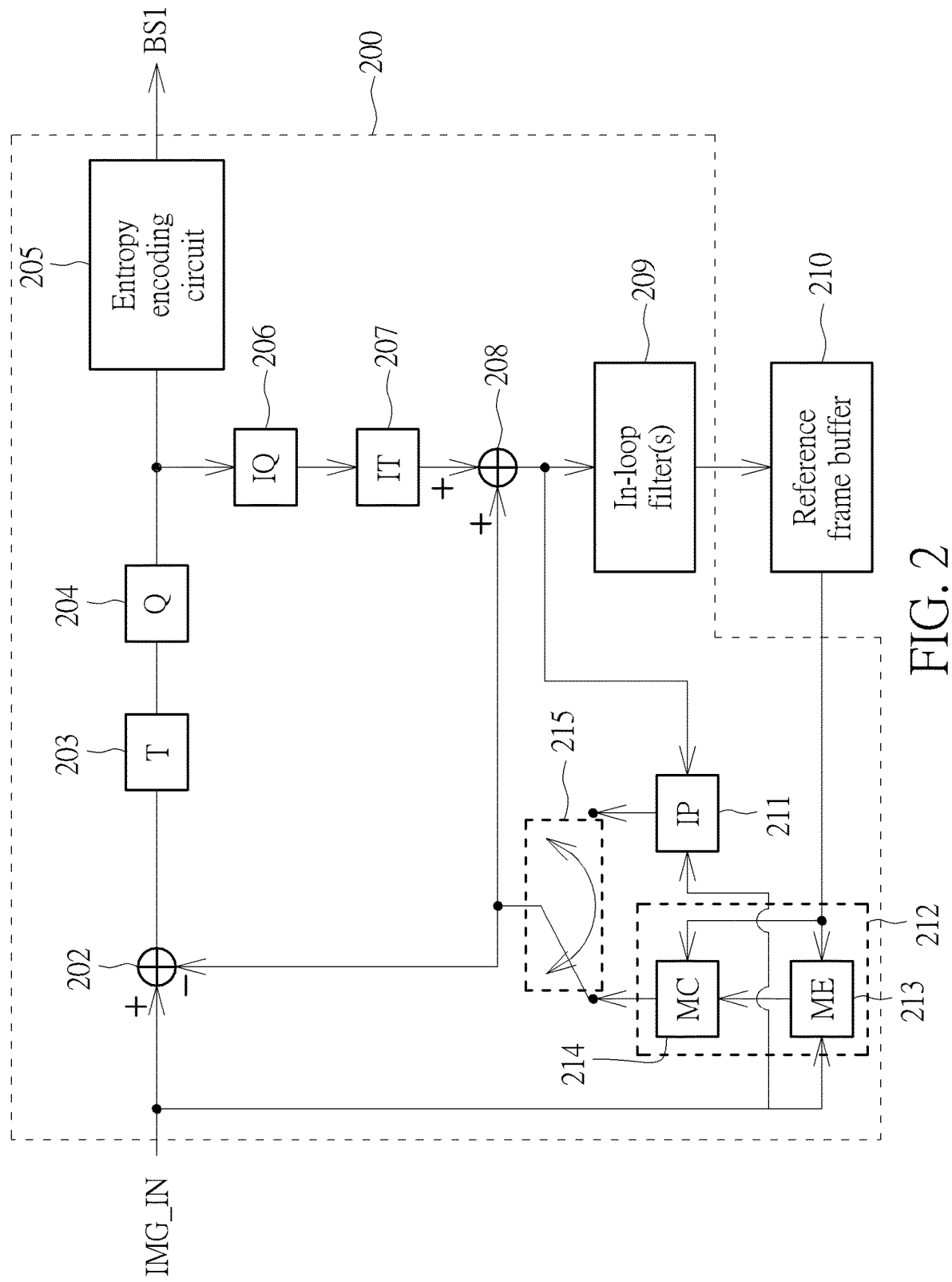
FIG. 2 is a diagram illustrating a video encoder according to an embodiment of the present invention.

FIG. 2 is a diagram illustrating a video encoder according to an embodiment of the present invention. The video encoder 102 shown in FIG. 1 may be implemented using the video encoder 200 shown in FIG. 2. It should be noted that the encoder architecture shown in FIG. 2 is for illustrative purposes only, and is not meant to be a limitation of the present invention. For example, different encoder architecture may be used under different coding standards, respectively. In this embodiment, the video encoder 200 includes a residual calculation circuit 202, a transform circuit (denoted by "T") 203, a quantization circuit (denoted by "Q") 204, an entropy encoding circuit (e.g., a variable length encoder) 205, an inverse quantization circuit (denoted by "IQ") 206, an inverse transform circuit (denoted by "IT") 207, a reconstruction circuit 208, at least one in-loop filter 209, an intra prediction circuit (denoted by "IP") 211, an inter prediction circuit 212 (which includes a motion estimation circuit (denoted by "ME") 213 and a motion compensation circuit (denoted by "MC") 214), and a mode decision circuit 215. Each of the frames IMG_IN is encoded to be a part of the first bitstream BS1 generated from the entropy encoding circuit 205. A deblocking filter may be used as one in-loop filter 209 coupled between the reconstruction circuit 208 and a reference frame buffer 210. A reconstructed frame generated at the reconstruction circuit 208 is processed by the in-loop filter 209 and then stored into the reference frame buffer 210 to act as a reference frame that may be used by the inter prediction circuit 214. For example, the video encoder 200 may be implemented in a chip, and the reference frame buffer 210 may be allocated in an off-chip memory such as a dynamic random access memory (DRAM). In a case where the video encoder 102 shown in FIG. 1 is implemented using the video encoder 200 shown in FIG. 2, the reference frame buffer 210 may be allocated in the storage device 106.

Since the present invention focuses on a bitstream post-processing scheme and basic functions and operations of circuit blocks in the video encoder 200 are known to those skilled in the pertinent art, further description of circuit blocks in the video encoder 200 is omitted here for brevity.

The bitstream processing circuit 104 is arranged to generate a control signal S_CTRL that instructs the video encoder 102 (which is a hardware video encoder) to encode frames IMG_IN into the first bitstream BS1, and is further arranged to perform a bitstream post-processing operation upon the first bitstream BS1 to produce a second bitstream BS2 that is different from the first bitstream BS1, and output the second bitstream BS2 as a compression output of the frames IMG_IN. Specifically, the bitstream processing circuit 104 fetches the first bitstream BS1 from the storage device (e.g., off-chip DRAM) 106, processes the first bitstream BS1 (which is an original compression output of the frames IMG_IN), and outputs the second bitstream BS2 (which is a post-processed compression output of the frames IMG_IN) to the storage device 106 for delivery. For example, the bitstream post-processing operation can be used to add new features, such as "reference picture list modification syntax" in a slice header and/or "decoded reference picture marking syntax" in a slice header, by post-processing slicer header syntaxes of the first bitstream BS1. For another example, the bitstream post-processing operation can be used to replace a hard-coded bitstream syntax in the first bitstream BS1, such as a syntax element unit type in a Network Abstraction Layer (NAL) unit. For yet another example, the bitstream post-processing operation can be used to correct error bits in the first bitstream BS1.

The bitstream post-processing operation may be a software-based post-processing operation or a hardware-based post-processing operation, depending upon the actual design considerations. In one exemplary design, the bitstream processing circuit 104 may be a processor (e.g., general purpose processor) which executes software (e.g., driver code) to apply the bitstream post-processing operation to the first bitstream BS1. In other words, the bitstream post-processing function of the video compression system 100 is achieved via software processing. In another exemplary design, the bitstream processing circuit 104 may be dedicated hardware which applies the bitstream post-processing operation to the first bitstream BS1. In other words, the bitstream post-processing function of the video compression system 100 is achieved via pure hardware.

Figure 3:
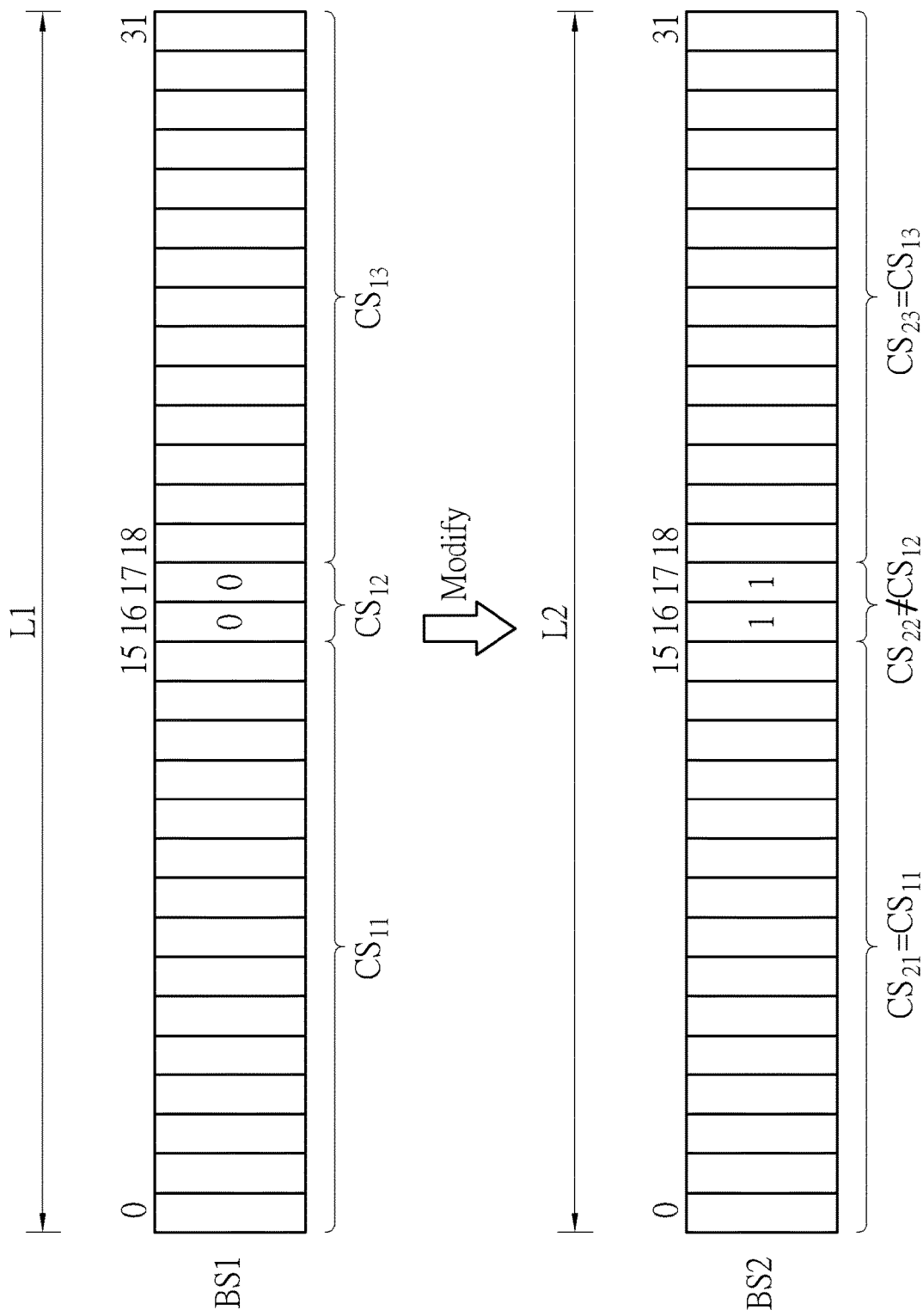
FIG. 3 is a diagram illustrating a first example of a bitstream post-processing operation performed by a bitstream processing circuit shown in FIG. 1.

The bitstream post-processing operation may include a modification operation, a removal operation, an insertion operation, and/or a bit-shifting operation (or byte-shifting operation). FIG. 3 is a diagram illustrating a first example of the bitstream post-processing operation performed by the bitstream processing circuit 104 shown in FIG. 1. For clarity and simplicity, it is assumed that the first bitstream BS1 includes 32 bits. Thus, the bitstream length L1 of the first bitstream BS1 is equal to 32. In this example, the bitstream post-processing operation includes a modification operation. Hence, the bitstream post-processing operation performed by the bitstream processing circuit 104 includes modifying at least one bit of the first bitstream BS1. As shown in FIG. 3, the first bitstream BS1 consists of a first bitstream segment (bit 0-bit 15) $CS_{11}$, a second bitstream segment (bit 16-bit 17) $CS_{12}$, and a third bitstream segment (bit 18-bit 31) $CS_{13}$. The second bitstream segment $CS_{12}$ with a 2-bit pattern "00" is modified (or replaced) by a different 2-bit pattern "11", thus resulting in a different second bitstream segment. It should be noted that the modification operation applied to a bitstream does not alter a bitstream length of the bitstream. As shown in FIG. 3, the second bitstream BS2 consists of a first bitstream segment (bit 0-bit 15) $CS_{21}$, a second bitstream segment (bit 16-bit 17) $CS_{22}$, and a third bitstream segment (bit 18-bit 31) $CS_{23}$, where $CS_{21}=CS_{11}$, $CS_{22} \neq CS_{12}$, and $CS_{23}=CS_{13}$. The second bitstream BS2 also includes 32 bits. Thus, the bitstream length L2 of the second bitstream BS2 is equal to the bitstream length L1 of the first bitstream BS1.

Figure 4:
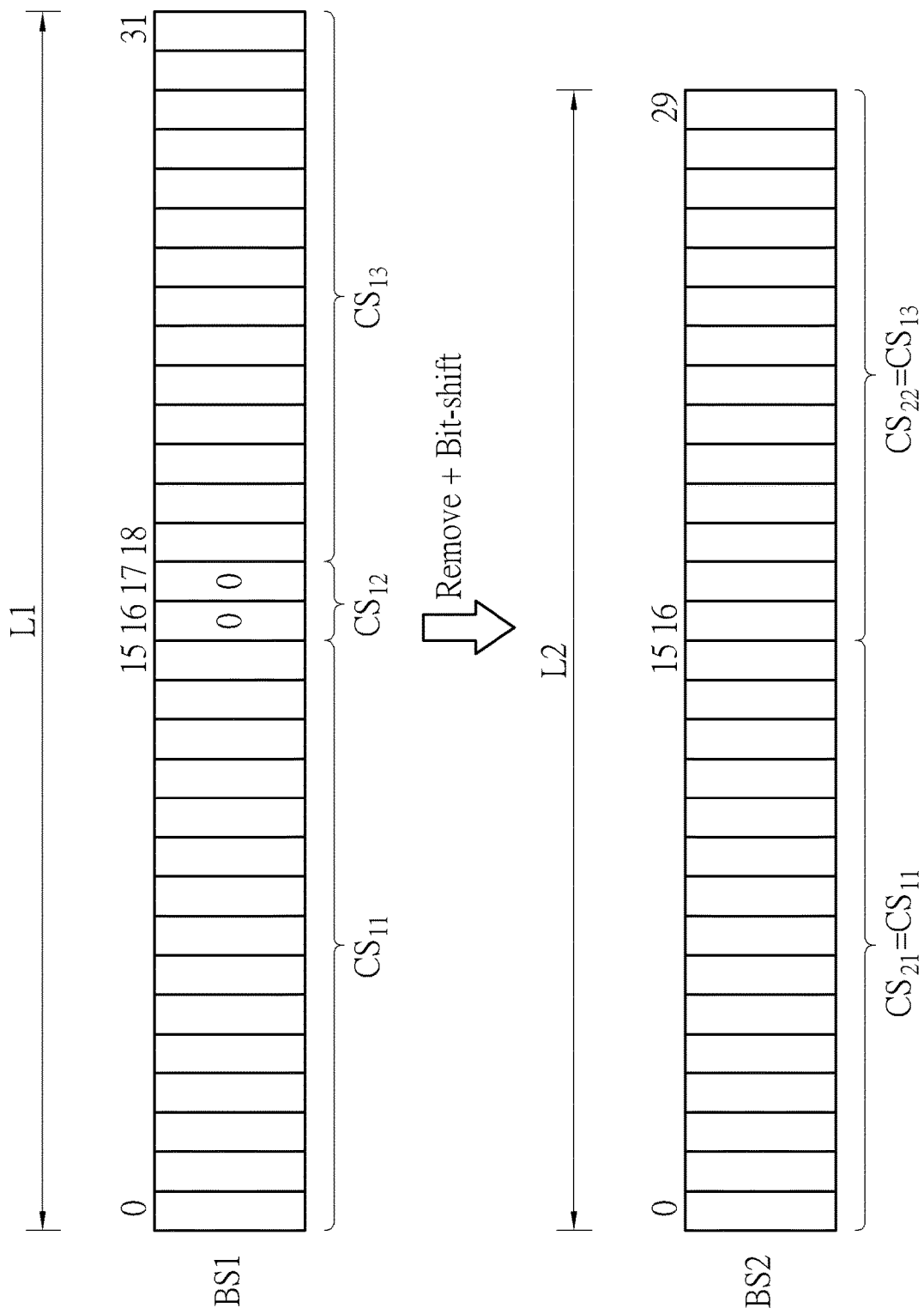
FIG. 4 is a diagram illustrating a second example of the bitstream post-processing operation performed by the bitstream processing circuit shown in FIG. 1.

FIG. 4 is a diagram illustrating a second example of the bitstream post-processing operation performed by the bitstream processing circuit 104 shown in FIG. 1. For clarity and simplicity, it is assumed that the first bitstream BS1 includes 32 bits. Thus, the bitstream length L1 of the first bitstream BS1 is equal to 32. In this example, the bitstream post-processing operation includes a removal operation and a bit-shifting operation. Hence, the bitstream post-processing operation performed by the bitstream processing circuit 104 includes removing at least one bit from the first bitstream BS1 and shifting a portion of the first bitstream BS1 leftward/rightward by at least one bit. As shown in FIG. 4, the first bitstream BS1 consists of a first bitstream segment (bit 0-bit 15) $CS_{11}$, a second bitstream segment (bit 16-bit 17) $CS_{12}$, and a third bitstream segment (bit 18-bit 31) $CS_{13}$. The second bitstream segment $CS_{12}$ with a 2-bit pattern "00" is removed from the first bitstream BS1, and the third bitstream segment $CS_{13}$ is left shifted by two bits, thus resulting in concatenation of an original bitstream segment (e.g., $CS_{11}$) and a left-shifted bitstream segment (e.g., $CS_{13}$). It should be noted that the removal operation applied to a bitstream will alter a bitstream length of the bitstream. As shown in FIG. 4, the second bitstream BS2 consists of a first bitstream segment (bit 0-bit 15) $CS_{21}$ and a second bitstream segment (bit 16-bit 29) $CS_{22}$, where $CS_{21}=CS_{11}$ and $CS_{22}=CS_{13}$. The second bitstream BS2 includes 30 bits. Thus, the bitstream length L2 of the second bitstream BS2 is different from (e.g., shorter than) the bitstream length L1 of the first bitstream BS1.

Figure 5:
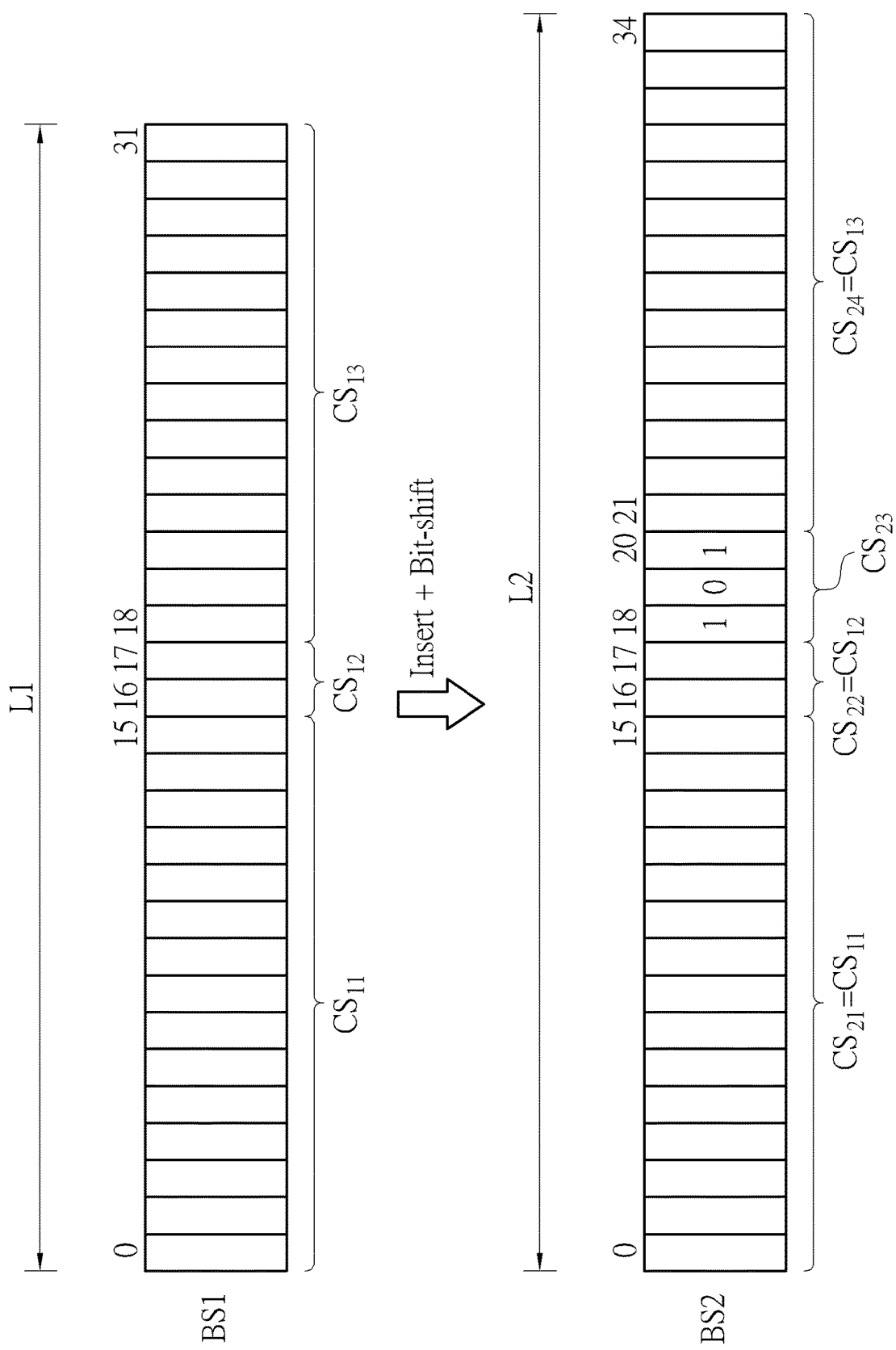
FIG. 5 is a diagram illustrating a third example of the bitstream post-processing operation performed by the bitstream processing circuit shown in FIG. 1.

FIG. 5 is a diagram illustrating a third example of the bitstream post-processing operation performed by the bitstream processing circuit 104 shown in FIG. 1. For clarity and simplicity, it is assumed that the first bitstream BS1 includes 32 bits. Thus, the bitstream length L1 of the first bitstream BS1 is equal to 32. In this example, the bitstream post-processing operation includes an insertion operation and a bit-shifting operation. Hence, the bitstream post-processing operation performed by the bitstream processing circuit 104 includes inserting at least one bit into the first bitstream BS1 and shifting a portion of the first bitstream BS1 by at least one bit. As shown in FIG. 5, the first bitstream BS1 consists of a first bitstream segment (bit 0-bit 15) $CS_{11}$, a second bitstream segment (bit 16-bit 17) $CS_{12}$, and a third bitstream segment (bit 18-bit 31) $CS_{13}$. The third bitstream segment $CS_{13}$ is right shifted by three bits, and an additional bitstream segment with a 3-bit pattern "101" is inserted between the second bitstream segment $CS_{12}$ and the third bitstream segment $CS_{13}$, thus resulting in concatenation of an original bitstream segment (e.g., $CS_{12}$), an inserted bitstream segment (e.g., $CS_{23}$) and a right-shifted bitstream segment (e.g., $CS_{13}$). It should be noted that the insertion operation applied to a bitstream will alter a bitstream length of the bitstream. As shown in FIG. 5, the second bitstream BS2 consists of a first bitstream segment (bit 0-bit 15) $CS_{21}$, a second bitstream segment (bit 16-bit 18) $CS_{22}$, a third bitstream segment (bit 18-bit 20) that is the inserted bitstream segment (which consists of effective syntax element(s) $CS_{23}$, and a fourth bitstream segment (bit 21-bit 34) $CS_{24}$, where $CS_{21}=CS_{11}$, $CS_{22}=CS_{12}$, and $CS_{24}=CS_{13}$. The second bitstream BS2 includes 35 bits. Thus, the bitstream length L2 of the second bitstream BS2 is different from (e.g., longer than) the bitstream length L1 of the first bitstream BS1.

In the example shown in FIG. 4, a length difference ΔL between the bitstream length L1 of the first bitstream BS1 and the bitstream length L2 of the second bitstream BS2 is equal to 2 due to removal of a 2-bit pattern "00". In the example shown in FIG. 5, a length difference ΔL between the bitstream length L1 of the first bitstream BS1 and the bitstream length L2 of the second bitstream BS2 is equal to 3 due to insertion of a 3-bit pattern "101". As mentioned above, the bitstream processing circuit 104 may be a processor (e.g., general purpose processor) which executes software (e.g., driver code) to apply the bitstream post-processing operation to the first bitstream BS1. In general, byte operation is more efficient than bit operation in software processing. The video compression system 100 is more efficient if the length difference ΔL is designed to be byte-aligned, meaning that the length difference ΔL is an integer multiple of 8 (i.e., 8*N, where N is a positive integer).

To address the above issue, the bitstream post-processing operation performed by the bitstream processing circuit 104 can further include a redundant syntax insertion operation which sets one or more redundant syntax elements and inserts the redundant syntax element(s) between a first portion of the first bitstream BS1 and a second portion of the first bitstream to ensure that the length difference ΔL between the bitstream length L1 of the first bitstream BS1 and the bitstream length L2 of the second bitstream BS2 is byte-aligned. For example, the first bitstream BS1 generated by the video encoder 102 includes a header section (e.g., a slice header or a frame header), and the bitstream post-processing operation performed by the bitstream processing circuit 104 is applied to the header section of the first bitstream BS1. In this way, one or more redundant syntax element(s) may be inserted into the header section to ensure that the length difference ΔL between the bitstream length L1 of the first bitstream BS1 and the bitstream length L2 of the second bitstream BS2 is byte-aligned. It should be noted that redundant syntax element (s) added to the header section should be properly set such that the inserted redundant syntax element(s) has no impact on decoding of frames at a video decoder. Hence, a decoding result of an encoded bitstream with no redundant syntax elements is the same as a decoding result of an encoded bitstream with redundant syntax elements.

Figure 6:
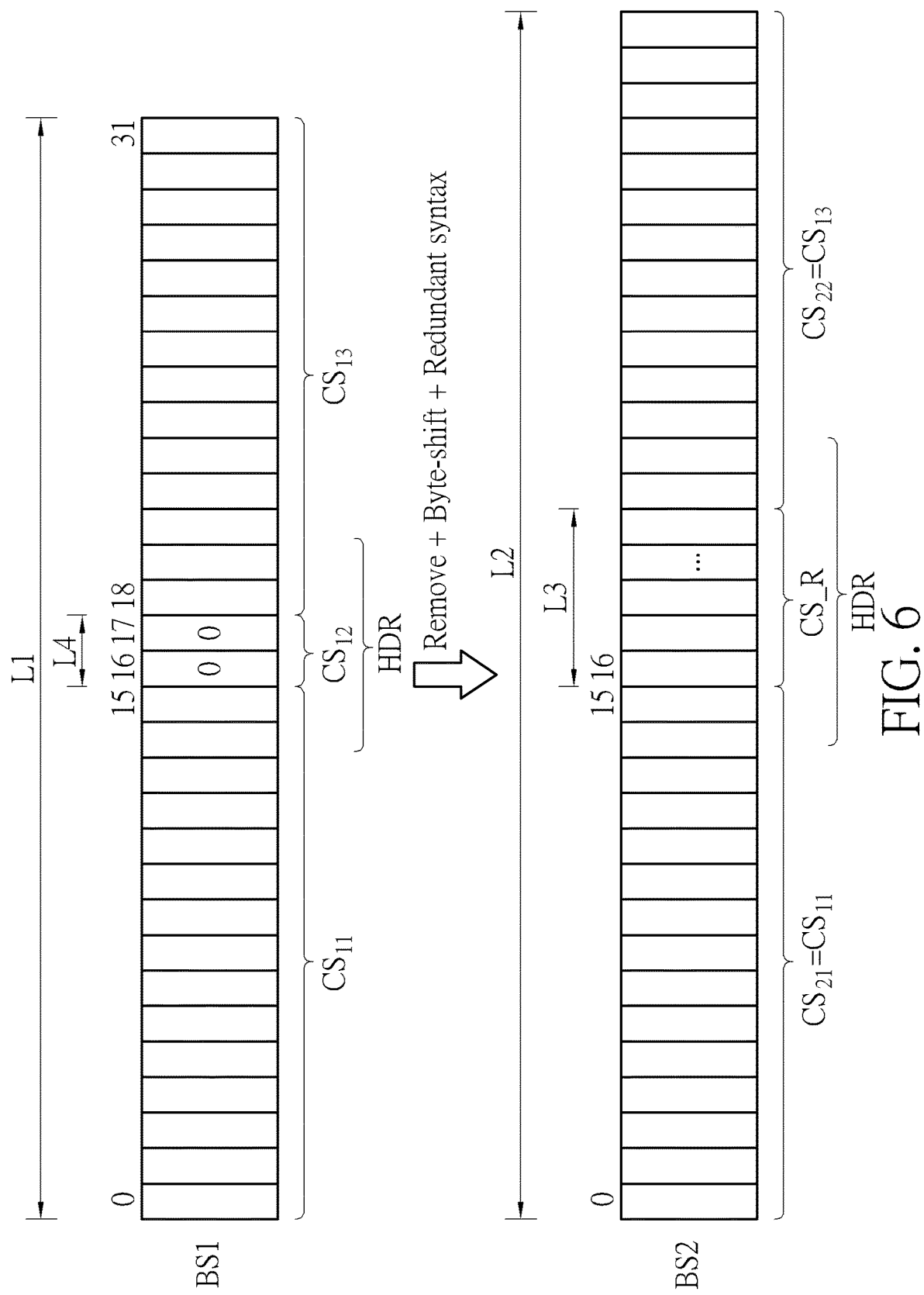
FIG. 6 is a diagram illustrating a fourth example of the bitstream post-processing operation performed by the bitstream processing circuit shown in FIG. 1.

FIG. 6 is a diagram illustrating a fourth example of the bitstream post-processing operation performed by the bitstream processing circuit 104 shown in FIG. 1. For clarity and simplicity, it is assumed that the first bitstream BS1 includes 32 bits. Thus, the bitstream length L1 of the first bitstream BS1 is equal to 32. As shown in FIG. 6, the first bitstream BS1 consists of a first bitstream segment (bit 0-bit 15) $CS_{11}$, a second bitstream segment (bit 16-bit 17) $CS_{12}$, and a third bitstream segment (bit 18-bit 31) $CS_{13}$. In this example, the bitstream post-processing operation performed by the bitstream processing circuit 104 needs to remove the second bitstream segment $CS_{12}$ with a 2-bit pattern "00" from the first bitstream BS1, where a bitstream length L4 of the second bitstream segment $CS_{12}$ is equal to 2, and the 2-bit pattern "00" may be a part of a header section (e.g., slice header or frame header) HDR included in the first bitstream BS1. If the proposed insertion of redundant syntax element (s) is not implemented, removal of the second bitstream segment $CS_{12}$ results in a length difference ΔL (ΔL=L4=2) that is not byte-aligned. In this example, the bitstream post-processing operation performed by the bitstream processing circuit 104 includes a removal operation, a byte-shifting operation, and a redundant syntax insertion operation, where the redundant syntax insertion operation is used to ensure that the length difference ΔL is byte-aligned.

As mentioned above, the bitstream length L4 of the second bitstream segment $CS_{12}$ to be removed is equal to 2.

Hence, the bitstream processing circuit 104 may create a redundant bitstream segment CS_R by setting one or more redundant syntax elements, where a bitstream length L3 of the redundant bitstream segment CS_R is properly controlled to ensure that (L3−L4) is an integer multiple of 8. For example, L3=8*N+L4=8*N+2, where N is a positive integer. After the redundant bitstream segment CS_R with the required bitstream length L3 is determined, the second bitstream segment $CS_{12}$ is removed from the first bitstream BS1, the third bitstream segment $CS_{13}$ is right shifted by (L3−L4) bits, and the redundant bitstream segment CS_R is inserted between the first bitstream segment $CS_{11}$ and the third bitstream segment $CS_{13}$ to be a part of the header section HDR, thus resulting in concatenation of an original bitstream segment (e.g., $CS_{11}$), an inserted redundant bitstream segment (e.g., CS_R), and a right-shifted bitstream segment (e.g., $CS_{13}$). It should be noted that the removal operation and the redundant syntax insertion operation applied to a bitstream may alter a bitstream length of the bitstream. As shown in FIG. 6, the second bitstream BS2 consists of a first bitstream segment $CS_{21}$, a second bitstream segment $CS_{22}$, and an inserted redundant bitstream segment (which consists of redundant syntax element(s)) CS_R, where $CS_{21}=CS_{11}$ and $CS_{22}=CS_{13}$. The bitstream length L2 of the second bitstream BS2 is different from (e.g., longer than) the bitstream length L1 of the first bitstream BS1. In this example, L2=L1+(L3−L4), where (L3−L4) is an integer multiple of 8 (i.e., L3−L4=8*N, where N is a positive integer).

Figure 7:
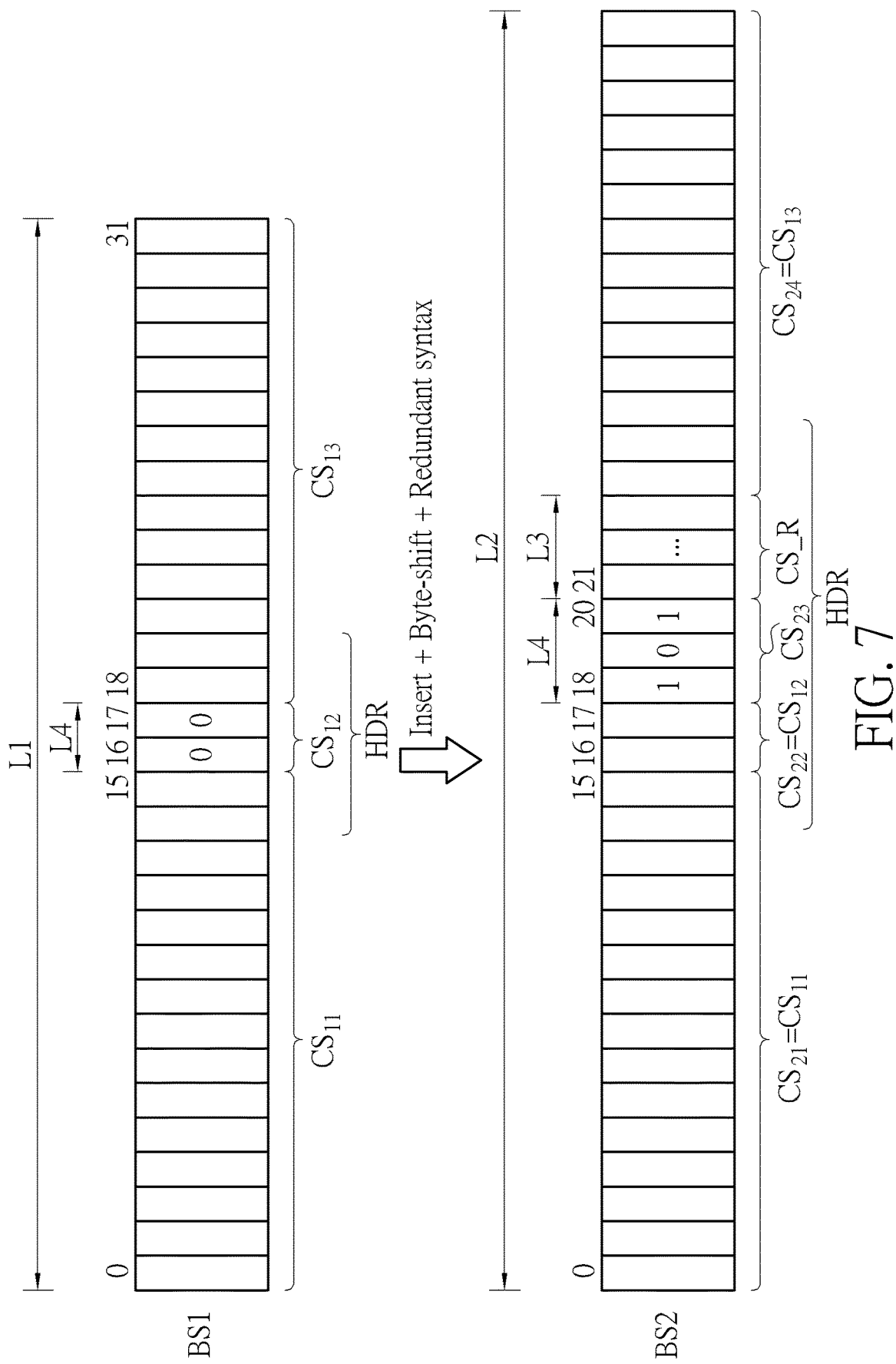
FIG. 7 is a diagram illustrating a fifth example of the bitstream post-processing operation performed by the bitstream processing circuit shown in FIG. 1.

FIG. 7 is a diagram illustrating a fifth example of the bitstream post-processing operation performed by the bitstream processing circuit 104 shown in FIG. 1. For clarity and simplicity, it is assumed that the first bitstream BS1 includes 32 bits. Thus, the bitstream length L1 of the first bitstream BS1 is equal to 32. As shown in FIG. 7, the first bitstream BS1 consists of a first bitstream segment (bit 0-bit 15) $CS_{11}$, a second bitstream segment (bit 16-bit 17) $CS_{12}$, and a third bitstream segment (bit 18-bit 31) $CS_{13}$. In this example, the bitstream post-processing operation performed by the bitstream processing circuit 104 needs to insert an additional bitstream segment $CS_{23}$ with a 3-bit pattern "101" between the second bitstream segment $CS_{12}$ and the third bitstream segment $CS_{13}$, where a bitstream length L4 of the additional bitstream segment $CS_{23}$ is equal to 3, and the 3-bit pattern "101" may be a part of a header section HDR included in the first bitstream BS1. If the proposed insertion of redundant syntax element(s) is not implemented, insertion of the additional bitstream segment $CS_{23}$ results in a length difference ΔL (ΔL=L4=3) that is not byte-aligned. In this example, the bitstream post-processing operation performed by the bitstream processing circuit 104 includes an insertion operation, a byte-shifting operation, and a redundant syntax insertion operation, where the redundant syntax insertion operation is used to ensure that the length difference ΔL is byte-aligned.

As mentioned above, the bitstream length L4 of the additional bitstream segment $CS_{23}$ to be inserted is equal to 3. Hence, the bitstream processing circuit 104 may create a redundant bitstream segment CS_R by setting one or more redundant syntax elements, where a bitstream length L3 of the redundant bitstream segment CS_R is properly controlled to ensure that (L3+L4) is an integer multiple of 8. For example, L3=8*N−L4=8*N−3, where N is a positive integer. After the redundant bitstream segment CS_R with the required bitstream length L3 is determined, the third bitstream segment $CS_{13}$ is right shifted by (L3+L4) bits, the additional bitstream segment $CS_{23}$ is inserted to be a part of the header section HDR and appended to the second bitstream segment $CS_{12}$, and the redundant bitstream segment CS_R is inserted to be another part of the header section and appended to the inserted additional bitstream segment $CS_{23}$, thus resulting in concatenation of an original bitstream segment (e.g., $CS_{12}$), an inserted additional bitstream segment (e.g., $CS_{23}$), an inserted redundant bitstream segment (e.g., CS_R), and a right-shifted bitstream segment (e.g., $CS_{13}$). It should be noted that the insertion operation and the redundant syntax insertion operation applied to a bitstream may alter a bitstream length of the bitstream. As shown in FIG. 7, the second bitstream BS2 consists of a first bitstream segment $CS_{21}$, a second bitstream segment $CS_{22}$, a third bitstream segment (bit 18-bit 20) that is the inserted additional bitstream segment (which consists of effective syntax element(s)) $CS_{23}$, an inserted redundant bitstream segment (which consists of redundant syntax element(s)) CS_R, and a fourth bitstream segment $CS_{24}$, where $CS_{21}=CS_{11}$, $CS_{22}=CS_{13}$, and $CS_{24}=CS_{13}$. The bitstream length L2 of the second bitstream BS2 is different from (e.g., longer than) the bitstream length L1 of the first bitstream BS1. In this example, L2=L1+(L3+L4), where (L3+L4) is an integer multiple of 8 (i.e., L3+L4=8*N, where N is a positive integer).

Figure 8:
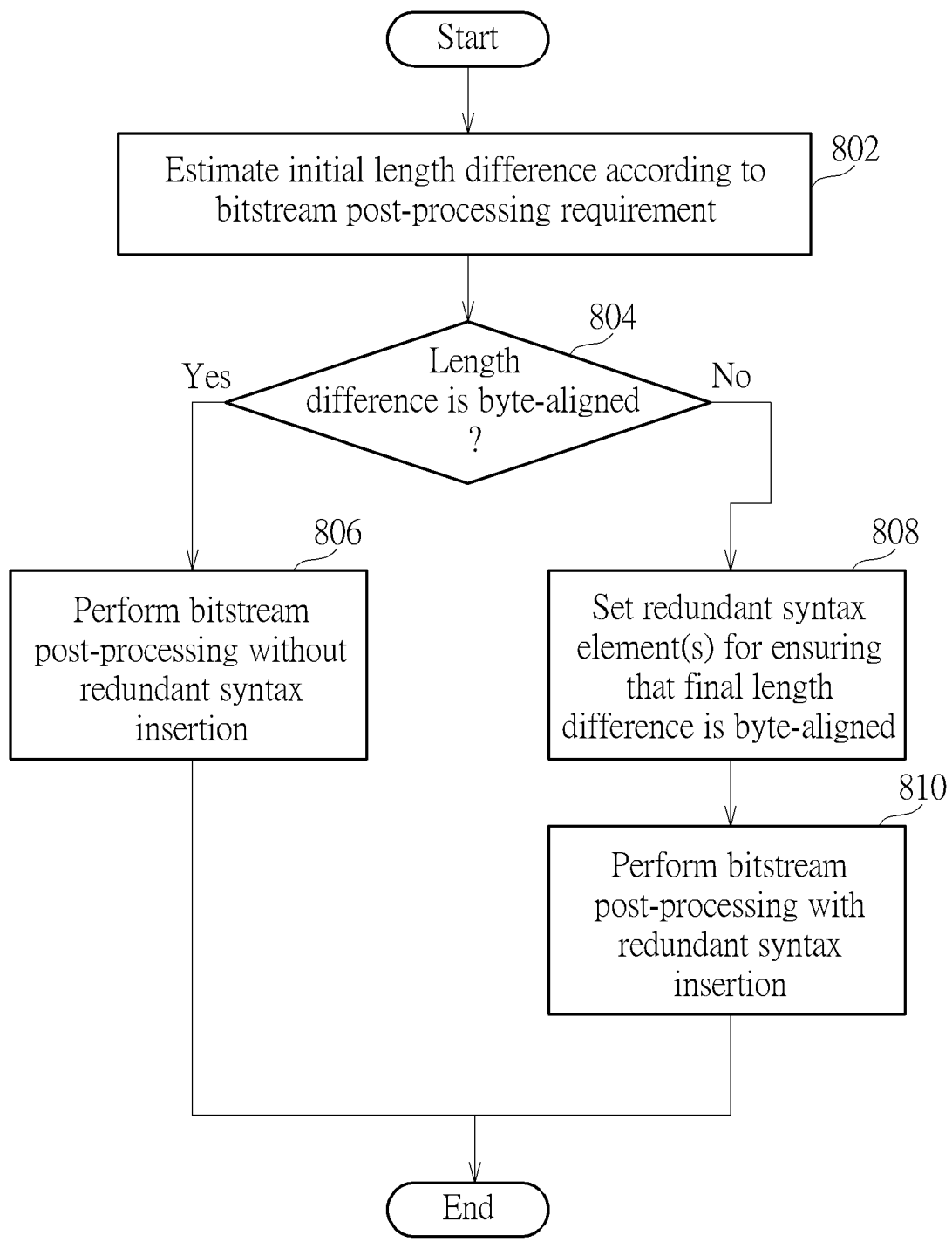
FIG. 8 is a flowchart illustrating a bitstream post-processing method according to an embodiment of the present invention.

FIG. 8 is a flowchart illustrating a bitstream post-processing method according to an embodiment of the present invention. In this example, the bitstream processing circuit 104 may be a processor (e.g., general purpose processor) which executes software (e.g., driver code) to apply the bitstream post-processing operation to a first bitstream BS1 (which is a compression output of the video encoder 102 being a hardware video decoder) for producing a second bitstream BS2 that is different from the first bitstream BS1. At step 802, the bitstream processing circuit 104 refers to a bitstream post-processing requirement (which needs to remove existing bit(s)/syntax element(s) from the first bitstream BS1 and/or insert new bit(s)/syntax element(s) into the first bitstream BS1) to estimate an initial length difference ΔL between a bitstream length L1 of the first bitstream BS1 and the bitstream length L2 of the second bitstream BS2. At step 804, the bitstream processing circuit 104 checks if the estimated initial length difference ΔL is byte-aligned (i.e., ΔL=8*N, where N is an integer not smaller than 0). If the length difference ΔL is byte-aligned (e.g., ΔL=0, 8, 16, or a larger value), the flow proceeds with step 806. At step 806, the bitstream processing circuit 104 performs a bitstream post-processing operation without redundant syntax insertion. For example, the bitstream processing circuit 104 performs a byte-shifting operation, and further performs an insertion operation and/or a removal operation, where no redundant syntax insertion operation is needed. If the length difference ΔL is not byte-aligned, the flow proceeds with step 808. At step 808, the bitstream processing circuit 104 sets one or more redundant syntax elements, where a bitstream length of redundant syntax element(s) is properly controlled to ensure that a final length difference ΔL between the bitstream length L1 of the first bitstream BS1 and the bitstream length L2 of the second bitstream BS2 is byte-aligned for facilitating the software processing. At step 810, the bitstream processing circuit 104 performs a bitstream post-processing operation with redundant syntax insertion. For example, the bitstream processing circuit 104 performs a byte-shifting operation and a redundant syntax insertion operation, and further performs an insertion operation and/or a removal operation.

For better understanding of technical features of the proposed bitstream post-processing scheme, several examples of applying post-processing to a bitstream generated from an H.264 video encoder (which is a hardware video encoder) are provided.

Figure 9:
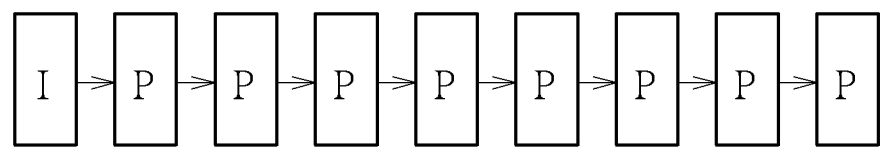
FIG. 9 is a diagram illustrating a plurality of frames encoded in a normal IPPP order according to an embodiment of the present invention.

In some embodiments of the present invention, the video encoder 102 shown in FIG. 1 is an H.264 video encoder that is only capable of generating bitstream syntax compatible with a normal IPPP order as shown in FIG. 9, where the symbol "I" represents an intra-frame (I-frame), and the symbol "P" represents a predictive-frame (P-frame). In addition, the maximum reference index is hard-coded as 1 in the normal IPPP order. As shown in FIG. 9, inter-prediction of a current P-frame always references a previous encoded frame.

For certain applications, a bitstream with a hierarchical P structure is required. By properly allocating a reference frame buffer to the video encoder 102 (particularly, addresses of reference frames stored in the reference frame buffer) and post-processing the first bitstream BS1 (particularly, headers in the first bitstream BS1), the video compression system 100 is capable of producing the second bitstream BS with a hierarchical P structure.

Figure 10:
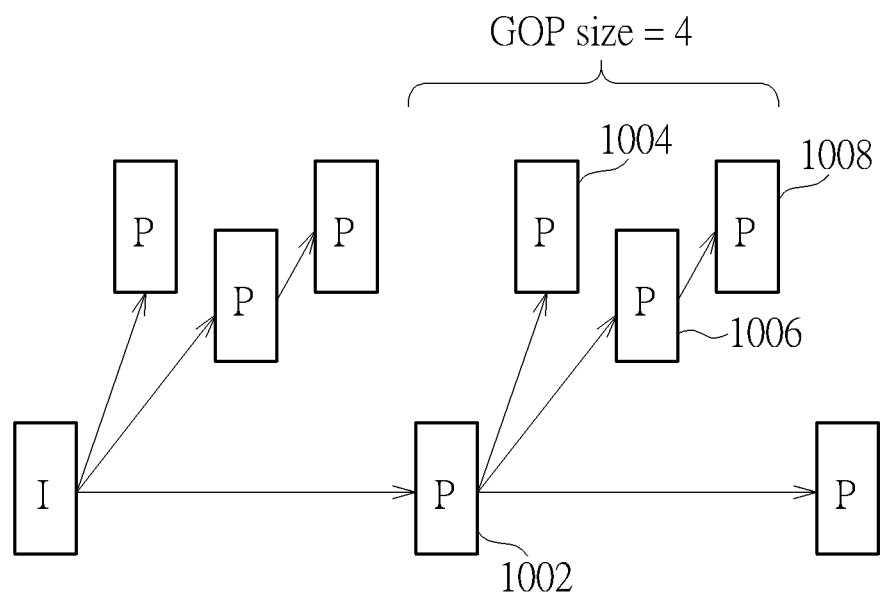
FIG. 10 is a diagram illustrating a plurality of frames encoded in a 3-layer hierarchical P structure with a GOP size=4 according to an embodiment of the present invention.

In a first example, the second bitstream BS generated by post-processing the first bitstream BS1 is compatible with a 3-layer hierarchical P structure with a group of picture (GOP) size=4, as illustrated in FIG. 10. For example, the P-frame 1002 is the $1^{st}$ frame in a current GOP, the P-frame 1004 is the $2^{nd}$ frame in the current GOP, the P-frame 1006 is the $3^{rd}$ frame in the current GOP, and the P-frame 1008 is the $4^{th}$ frame in the current GOP. Inter prediction of the $1^{st}$ frame of the current GOP references the $1^{st}$ frame of a previous GOP. Inter prediction of the $2^{nd}$ frame of the current GOP references the $1^{st}$ frame of the current GOP. Inter prediction of the $3^{rd}$ frame of the current GOP references the $1^{st}$ frame of the current GOP. Inter prediction of the $4^{th}$ frame of the current GOP references the $3^{rd}$ frame of the current GOP.

In accordance with the 3-layer hierarchical P structure shown in FIG. 10, the bitstream processing circuit 104 performs the bitstream post-processing operation upon a slice header of the P-frame 1002 (which is the $1^{st}$ frame of the current GOP) by replacing the syntax element ref_pic_list_modification_flag_10 (originally hard-coded as 1'b0) with the following syntax elements:
 ref_pic_list_modification_flag_10=1 (1-bit);
 modification_of_pic_nums_idc=2 (3-bit);
 long_term_pic_num=0 (1-bit); and
 modification_of_pic_nums_idc=3 (5-bit).

Hence, this part introduces a 9-bit additional bitstream length.

The reference picture list modification syntax contains syntax elements, including ref_pic_list_modification_flag_10, modification_of_pic_nums_idc, long_term_pic_num, modification_of_pic_nums_idc, etc., that specify the change from the initial reference picture lists to the reference picture lists to be used for decoding the slice. The syntax element ref_pic_list_modification_flag_10 equal to 1 specifies that the syntax element modification_of_pic_nums_idc is present for specifying reference picture list 0, and the syntax element ref_pic_list_modification_flag_10 equal to 0 specifies that this syntax element modification_of_pic_nums_idc is not present. The syntax element long_term_pic_num specifies the long-term picture number of the picture being moved to the current index in the list. The syntax element modification_of_pic_nums_idc together with long_term_pic_num specifies which of the reference pictures are re-mapped. The syntax element modification_of_pic_nums_idc equal to 2 indicates that the syntax element long_term_pic_num is present and specifies the long-term picture number for a reference picture. The syntax element modification_of_pic_nums_idc equal to 2 ends the loop for modification of the initial reference picture list.

Furthermore, the bitstream processing circuit 104 performs the bitstream post-processing operation upon the slice header of the P-frame 1002 (which is the $1^{st}$ frame of the current GOP) by replacing the syntax element adaptive_ref_pic_marking_mode_flag (originally hard-coded as 1'b0) with the following syntax elements:
 adaptive_ref_pic_marking_mode_flag=1 (1-bit);
 memory_management_control_operation=6 (5-bits)+long_term_frame_idx=0 (1-bit); and
 memory_management_control_operation=0 (1-bit).

Hence, this part introduces a 7-bit additional bitstream length.

Therefore, the number of total additional bits of the P-frame 1002 (which is the $1^{st}$ frame of the current GOP) is 16 (ΔL=16, byte-aligned).

The decoded reference picture marking syntax contains syntax elements, including adaptive_ref_pic_marking_mode_flag, memory_management_control_operation, long_term_frame_idx, etc., that specify marking of the reference pictures. The syntax element adaptive_ref_pic_marking_mode_flag selects the reference picture marking mode of the currently decoded picture. The adaptive_ref_pic_marking_mode_flag equal to 0 selects a sliding window reference picture marking mode that is a marking mode providing a first-in first-out mechanism for short-term reference pictures. The adaptive_ref_pic_marking_mode_flag equal to 1 selects an adaptive reference picture marking mode that is a reference picture marking mode providing syntax elements to specify marking of reference pictures as "unused for reference" and to assign long-term frame indices. The syntax element memory_management_control_operation specifies a control operation to be applied to affect the reference picture marking. The syntax element memory_management_control_operation is followed by data necessary for the operation specified by the value of memory_management_control_operation. The syntax element memory_management_control_operation equal to 0 ends the loop of memory management control operation. The syntax element memory_management_control_operation equal to 4 selects a memory management control operation that specifies the maximum long-term frame index and marks all long-term reference pictures having long-term frame indices greater than the maximum value as "unused for reference". The syntax element memory_management_control_operation equal to 6 selects a memory management control operation that marks the current picture as "used for long-term reference" and assigns a long-term frame index to it. The syntax element long_term_frame_idx is used to assign a long-term frame index to a picture.

In accordance with the 3-layer hierarchical P structure shown in FIG. 10, the bitstream processing circuit 104 performs the bitstream post-processing operation upon a slice header of the P-frame 1004 (which is the $2^{nd}$ frame of the current GOP) by replacing the syntax element ref_pic_list_modification_flag_10 (originally hard-coded as 1'b0) with the following syntax elements:
 ref_pic_list_modification_flag_10=1 (1-bit);
 modification_of_pic_nums_idc=2 (3-bit);
 long_term_pic_num=0 (1-bit); and
 modification_of_pic_nums_idc=3 (5-bit).

Hence, this part introduces a 9-bit additional bitstream length.

Furthermore, the bitstream processing circuit 104 performs the bitstream post-processing operation upon the slice header of the P-frame 1004 (which is the $2^{nd}$ frame of the current GOP) by replacing the syntax element adaptive_ref_pic_marking_mode$_{13}$ flag (originally hard-coded as 1'b0) with the following syntax elements:

adaptive_ref_pic_marking_mode_flag=1 (1-bit);
memory_management_control_operation=6 (5-bits)+ long_term_frame_idx=3 (5-bit);
memory_management_control_operation=4 (5-bits)+ long_term_frame_idx=3 (5-bit);
memory_management_control_operation=4 (5-bits)+ long_term_frame_idx=3 (5-bit); and
memory_management_control_operation=0 (1-bit).

Hence, this part introduces a 31-bit additional bitstream length.

Therefore, the number of total additional bits of the P-frame 1004 (which is the $2^{nd}$ frame of the current GOP) is 40 (ΔL=40, byte-aligned). It should be noted that redundant syntax elements, including "memory_management_control_operation=6+long_term_frame_idx=3", "memory_management_control_operation=4+long_term_frame_idx=3", "memory_management_control_operation=4+long_term_frame_idx=3", and "memory_management_control_operation=0", are intentionally added to ensure a byte-aligned length difference ΔL.

In accordance with the 3-layer hierarchical P structure shown in FIG. 10, the bitstream processing circuit 104 performs the bitstream post-processing operation upon a slice header of the P-frame 1006 (which is the $3^{rd}$ frame of the current GOP) by replacing the syntax element ref_pic_list_modification_flag_10 (originally hard-coded as 1'b0) with the following syntax elements:

ref_pic_list_modification_flag_10=1 (1-bit);
modification_of_pic_nums_idc=2 (3-bit);
long_term_pic_num=0 (1-bit); and
modification_of_pic_nums_idc=3 (5-bit).

Hence, this part introduces a 9-bit additional bitstream length.

Furthermore, the bitstream processing circuit 104 performs the bitstream post-processing operation upon the slice header of the P-frame 1006 (which is the $3^{rd}$ frame of the current GOP) by replacing the syntax element adaptive_ref_pic_marking_mode_flag (originally hard-coded as 1'b0) with the following syntax elements:

adaptive_ref_pic_marking_mode_flag=1 (1-bit);
memory_management_control_operation=6 (5-bits)+ long_term_frame_idx=1 (3-bit);
memory_management_control_operation=4 (5-bits)+ long_term_frame_idx=3 (5-bit);
memory_management_control_operation=4 (5-bits)+ long_term_frame_idx=3 (5-bit);
memory_management_control_operation=4 (5-bits)+ long_term_frame_idx=3 (5-bit); and
memory_management_control_operation=0 (1-bit).

Hence, this part introduces a 39-bit additional bitstream length.

Therefore, the number of total additional bits of the P-frame 1006 (which is the $3^{rd}$ frame of the current GOP) is 48 (ΔL=48, byte-aligned). It should be noted that redundant syntax elements, including "memory_management_control_operation=4+long_term_frame_idx=3", "memory_management_control_operation=4+long_term_frame_idx=3", and "memory_management_control_operation=4+long_term_frame_idx=3", are intentionally added to ensure a byte-aligned length difference ΔL.

In accordance with the 3-layer hierarchical P structure shown in FIG. 10, the bitstream processing circuit 104 performs the bitstream post-processing operation upon a slice header of the P-frame 1008 (which is the $4^{th}$ frame of the current GOP) by replacing the syntax element ref_pic_list_modification_flag_10 (originally hard-coded as 1'b0) with the following syntax elements:

ref_pic_list_modification_flag_10=1 (1-bit);
modification_of_pic_nums_idc=2 (3-bit);
long_term_pic_num=1 (3-bit); and
modification_of_pic_nums_idc=3 (5-bit).

Hence, this part introduces an 11-bit additional bitstream length.

Furthermore, the bitstream processing circuit 104 performs the bitstream post-processing operation upon the slice header of the P-frame 1008 (which is the $4^{th}$ frame of the current GOP) by replacing the syntax element adaptive_ref_pic_marking_mode_flag (originally hard-coded as 1'b0) with the following syntax elements:

adaptive_ref_pic_marking_mode_flag=1 (1-bit);
memory_management_control_operation=6 (5-bits)+ long_term_frame_idx=3 (5-bit);
memory_management_control_operation=6 (5-bits)+ long_term_frame_idx=3 (5-bit); and
memory_management_control_operation=0 (1-bit).

Hence, this part introduces a 21-bit additional bitstream length.

Therefore, the number of total additional bits of the P-frame 1008 (which is the $4^{th}$ frame of the current GOP) is 32 (ΔL=32, byte-aligned). It should be noted that redundant syntax elements, including "memory_management_control_operation=6+long_term_frame_idx=3", "memory_management_control_operation=6+long_term_frame_idx=3", and"memory_management_control_operation=0", are intentionally added to ensure a byte-aligned length difference ΔL.

Figure 11:
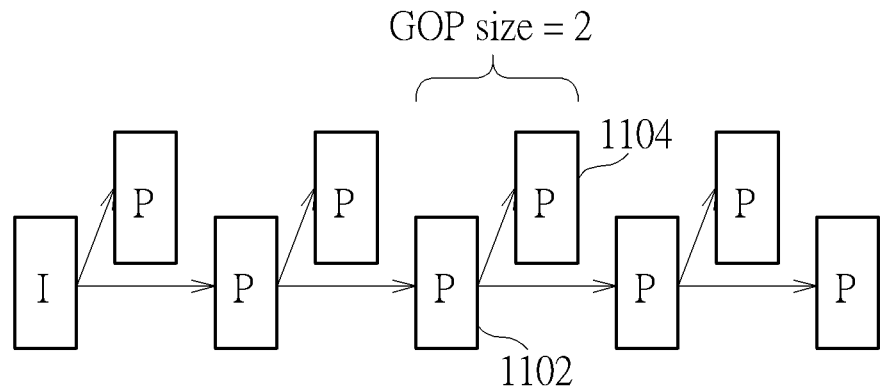
FIG. 11 is a diagram illustrating a plurality of frames encoded in a 2-layer hierarchical P structure with a GOP size=2 according to an embodiment of the present invention.

In a second example, the second bitstream BS generated by post-processing the first bitstream BS1 is compatible with a 2-layer hierarchical P structure with a group of picture (GOP) size=2, as illustrated in FIG. 11. For example, the P-frame 1102 is the $1^{st}$ frame in a current GOP, and the P-frame 1104 is the $2^{nd}$ frame in the current GOP. Inter prediction of the $1^{st}$ frame of the current GOP references the $1^{st}$ frame of a previous GOP. Inter prediction of the $2^{nd}$ frame of the current GOP references the $1^{st}$ frame of the current GOP.

In accordance with the 2-layer hierarchical P structure shown in FIG. 11, the bitstream processing circuit 104 performs the bitstream post-processing operation upon a slice header of the P-frame 1102 (which is the $1^{st}$ frame of the current GOP) by replacing the syntax element ref_pic_list_modification_flag_10 (originally hard-coded as 1'b0) with the following syntax elements:

ref_pic_list_modification_flag_10=1 (1-bit);
modification_of_pic_nums_idc=2 (3-bit);
long_term_pic_num=0 (1-bit); and
modification_of_pic_nums_idc=3 (5-bit).

Hence, this part introduces a 9-bit additional bitstream length.

Furthermore, the bitstream processing circuit 104 performs the bitstream post-processing operation upon the slice header of the P-frame 1102 (which is the $1^{st}$ frame of the current GOP) by replacing the syntax element adaptive_ref_pic_marking_mode_flag (originally hard-coded as 1'b0) with the following syntax elements:
   adaptive_ref_pic_marking_mode_flag=1 (1-bit);
   memory_management_control_operation=6 (5-bits)+ long_term_frame_idx=0 (1-bit); and
   memory_management_control_operation=0 (1-bit).

Hence, this part introduces a 7-bit additional bitstream length.

Therefore, the number of total additional bits of the P-frame 1102 (which is the $1^{st}$ frame of the current GOP) is 16 (ΔL=16, byte-aligned).

In accordance with the 2-layer hierarchical P structure shown in FIG. 11, the bitstream processing circuit 104 performs the bitstream post-processing operation upon a slice header of the P-frame 1104 (which is the $2^{nd}$ frame of the current GOP) by replacing the syntax element ref_pic_list_modification_flag_10 (originally hard-coded as 1'b0) with the following syntax elements:
   ref_pic_list_modification_flag_10=1 (1-bit);
   modification_of_pic_nums_idc=2 (3-bit);
   long_term_pic_num=0 (1-bit); and
   modification_of_pic_nums_idc=3 (5-bit).

Hence, this part introduces a 9-bit additional bitstream length.

Furthermore, the bitstream processing circuit 104 performs the bitstream post-processing operation upon the slice header of the P-frame 1104 (which is the $2^{nd}$ frame of the current GOP) by replacing the syntax element adaptive_ref_pic_marking_mode_flag (originally hard-coded as 1'b0) with the following syntax elements:
   adaptive_ref_pic_marking_mode_flag=1 (1-bit);
   memory_management_control_operation=6 (5-bits)+ long_term_frame_idx=3 (5-bit);
   memory_management_control_operation=4 (5-bits)+ long_term_frame_idx=3 (5-bit);
   memory_management_control_operation=4 (5-bits)+ long_term_frame_idx=3 (5-bit); and
   memory_management_control_operation=0 (1-bit).

Hence, this part introduces a 31-bit additional bitstream length.

Therefore, the number of total additional bits of the P-frame 1104 (which is the $2^{nd}$ frame of the current GOP) is 40 (ΔL=40, byte-aligned). It should be noted that redundant syntax elements, including "memory_management_control_operation=6+long_term_frame_idx=3", "memory_management_control_operation=4+long_term_frame_idx=3", "memory_management_control_operation=4+long_term_frame_idx=3", and "memory_management_control_operation=0", are intentionally added to ensure a byte-aligned length difference ΔL.

Figure 12:
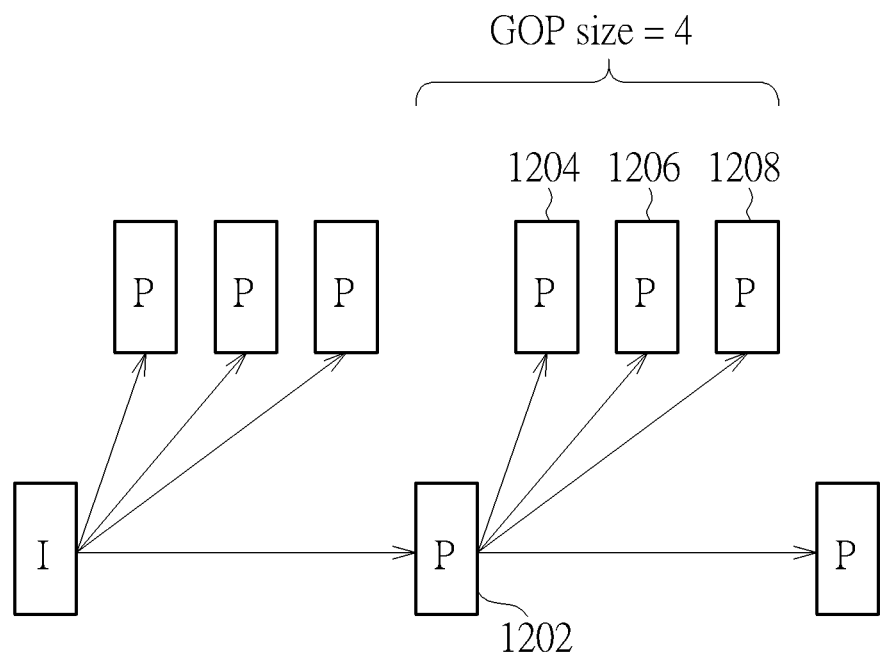
FIG. 12 is a diagram illustrating a plurality of frames encoded in a non-reference P structure with a GOP size=4 according to an embodiment of the present invention.

For certain applications, a bitstream with a non-reference P structure is required. By properly allocating a reference frame buffer to the video encoder 102 (particularly, addresses of reference frames stored in the reference frame buffer) and post-processing the first bitstream BS1 (particularly, headers in the first bitstream BS1), the video compression system 100 is capable of producing the second bitstream BS with a non-reference P structure. In one example, the second bitstream BS generated by post-processing the first bitstream BS1 is compatible with a non-reference P structure with a group of picture (GOP) size=4, as illustrated in FIG. 12. The P-frame 1202 is the $1^{st}$ frame in a current GOP, the P-frame 1204 is the $2^{nd}$ frame in the current GOP, the P-frame 1206 is the $3^{rd}$ frame in the current GOP, and the P-frame 1208 is the $4^{th}$ frame in the current GOP. Inter prediction of the $1^{st}$ frame of the current GOP references the $1^{st}$ frame of a previous GOP. Inter prediction of other frames in the current GOP references the same $1^{st}$ frame of the current GOP.

In accordance with the non-reference P structure shown in FIG. 12, the bitstream processing circuit 104 performs the bitstream post-processing operation upon a slice header of the P-frame 1202 (which is the $1^{st}$ frame of the current GOP) by replacing the syntax element ref_pic_list_modification_flag_10 (originally hard-coded as 1'b0) with the following syntax elements:
   ref_pic_list_modification_flag_10=1 (1-bit);
   modification_of_pic_nums_idc=2 (3-bit);
   long_term_pic_num=0 (1-bit); and
   modification_of_pic_nums_idc=3 (5-bit).

Hence, this part introduces a 9-bit additional bitstream length.

Furthermore, the bitstream processing circuit 104 performs the bitstream post-processing operation upon the slice header of the P-frame 1202 (which is the $1^{st}$ frame of the current GOP) by replacing the syntax element adaptive_ref_pic_marking_mode_flag (originally hard-coded as 1'b0) with the following syntax elements:
   adaptive_ref_pic_marking_mode_flag=1 (1-bit);
   memory_management_control_operation=6 (5-bits)+ long_term_frame_idx=0 (1-bit); and
   memory_management_control_operation=0 (1-bit).

Hence, this part introduces a 7-bit additional bitstream length.

Therefore, the number of total additional bits of the P-frame 1202 (which is the $1^{st}$ frame of the current GOP) is 16 (ΔL=16, byte-aligned).

In accordance with the non-reference P structure shown in FIG. 12, the bitstream processing circuit 104 performs the bitstream post-processing operation upon a slice header of each of P-frames 1204, 1206, and 1208 (which are the $2^{nd}$ frame, $3^{rd}$ frame, and $4^{th}$ frame of the current GOP, respectively) by replacing the syntax element ref_pic_list_modification_flag_10 (originally hard-coded as 1'b0) with the following syntax elements:
   ref_pic_list_modification_flag_10=1 (1-bit);
   modification_of_pic_nums_idc=2 (3-bit);
   long_term_pic_num=0 (1-bit); and
   modification_of_pic_nums_idc=3 (5-bit).

Hence, this part introduces a 9-bit additional bitstream length.

Furthermore, the bitstream processing circuit 104 performs the bitstream post-processing operation upon the slice header of each of P-frames 1204, 1206, and 1208 (which are the $2^{nd}$ frame, $3^{rd}$ frame, and $4^{th}$ frame of the current GOP, respectively) by modifying the syntax element ref_idc (originally hard-coded as 2'b10) as ref_idc=0 (2-bit), where the syntax element ref_idc equal to 0 indicates that it is not used as a reference, and the syntax element ref_idc equal to a value larger than 0 indicates that it is used as a reference. Hence, this part introduces no additional bitstream length. In this example, the number of total additional bits of each of P-frames 1204, 1206, and 1208 (which are the $2^{nd}$ frame, the $3^{rd}$ frame, and the $4^{th}$ frame of the current GOP, respectively) is 9 (ΔL=9, not byte-aligned). Alternatively, redundant syntax element(s) may be intentionally added to ensure a byte-aligned length difference ΔL.

In some embodiments, the video encoder 102 shown in FIG. 1 is an H.264 video encoder that is incapable of encoding an instantaneous decoding refresh (IDR) frame in the first bitstream BS1. Instead, only I-frames or P-frames can be encoded. The IDR-frame can be used to clear contents of a reference frame buffer. When an IDR-frame is encoded in the first bitstream BS1 sent to a video decoder, the video decoder marks all reference frames in the reference frame buffer as 'unused for reference'. All subsequently transmitted slices are decoded without reference to any reference frame decoded before the IDR-frame. However, the reference frame buffer is not cleared with an I-frame. That is, any frame decoded after an I-frame can use a reference frame decoded before the I-frame. For a slice header of an I-frame encoded by the video encoder 102, the syntax element ref_idc is hard-coded as 2 (2-bit), the syntax element unit_type is hard-coded as 1 (5-bit), the syntax element slice_type is hard-coded as 7 (7-bit), and the syntax element adaptive_ref_pic_marking_mode_flag is hard-coded as 0 (1-bit). The syntax element slice_type specifies the coding type of the slice. The syntax element slice_type equal to 2 or 7 indicates an I-slice. The syntax element unit_type equal to 1 indicates a coded slice of a non-IDR frame. The syntax element unit_type equal to 5 indicates a coded slice of an IDR-frame.

By post-processing the first bitstream BS1 generated by the video encoder 102 that is a hardware video encoder implemented using dedicated hardware, the video compression system 100 is capable of producing the second bitstream BS1 with IDR-frames. For example, the syntax element slice_type remains hard-coded as 7 (7-bit) in the slice header, and the bitstream post-processing operation performed by the bitstream processing circuit 104 upon the slice header includes modifying the syntax element ref_idc to 3 (2-bit), modifying the syntax element unit_type to 5 (5-bit), inserting the syntax element idr_pic_id that is encoded as 7 (7-bit) when the frame number is even and is encoded as 8 (7-bit) when the frame number is odd, removing the syntax element adaptive_ref_pic_marking_mode_flag (1-bit), inserting the syntax element no_output_of_prior_pics_flag that is encoded as 0 (1-bit), and inserting the syntax element long_term_reference_flag that is encoded as 0 (1-bit). The syntax element idr_pic_id identifies an IDR-frame. The syntax element no_output_of_prior_pics_flag specifies how the previously-decoded pictures in the decoded picture buffer are treated after decoding of an IDR-frame. The syntax element no_output_of_prior_pics_flag equal to 0 indicates that the reference frame buffer is emptied. The syntax element long_term_reference_flag equal to 0 specifies that the IDR-frame is marked as "used for short-term reference". In this example, the bitstream post-processing operation applied to the slice header of an I-frame encoded by the video encoder 102 introduces an 8-bit additional bitstream length (ΔL=8, byte-aligned).

For another example, the bitstream post-processing operation performed by the bitstream processing circuit 104 upon the slice header includes modifying the syntax element ref_idc to 3 (2-bit), modifying the syntax element unit_type to 5 (5-bit), modifying the syntax element slice_type to 2 (3-bit), inserting the syntax element idr_pic_id syntax that is encoded as 1 (3-bit) when the frame number is even and is encoded as 2 (3-bit) when the frame number is odd, removing the syntax element adaptive_ref_pic_marking_mode_flag (1-bit), inserting the syntax element no_output_of_prior_pics_flag that is encoded as 0 (1-bit), and inserting the syntax element long_term_reference_flag that is encoded as 0 (1-bit). Hence, the bitstream post-processing operation applied to the slice header of an I-frame encoded by the video encoder 102 introduces no additional bitstream length (ΔL=0, byte-aligned).

In some embodiments of the present invention, the video encoder 102 shown in FIG. 1 is capable of generating the first bitstream BS1 that is an H.264/Advanced Video Coding (AVC) bitstream. In order to encode syntaxes specified in a Scalable Video Coding (SVC) standard (or H.264/AVC Annex-G), the bitstream processing circuit 104 applies a bitstream post-processing operation to the first bitstream BS1 for producing the second bitstream BS2 that meets the requirement of the SVC standard.

Figure 13:
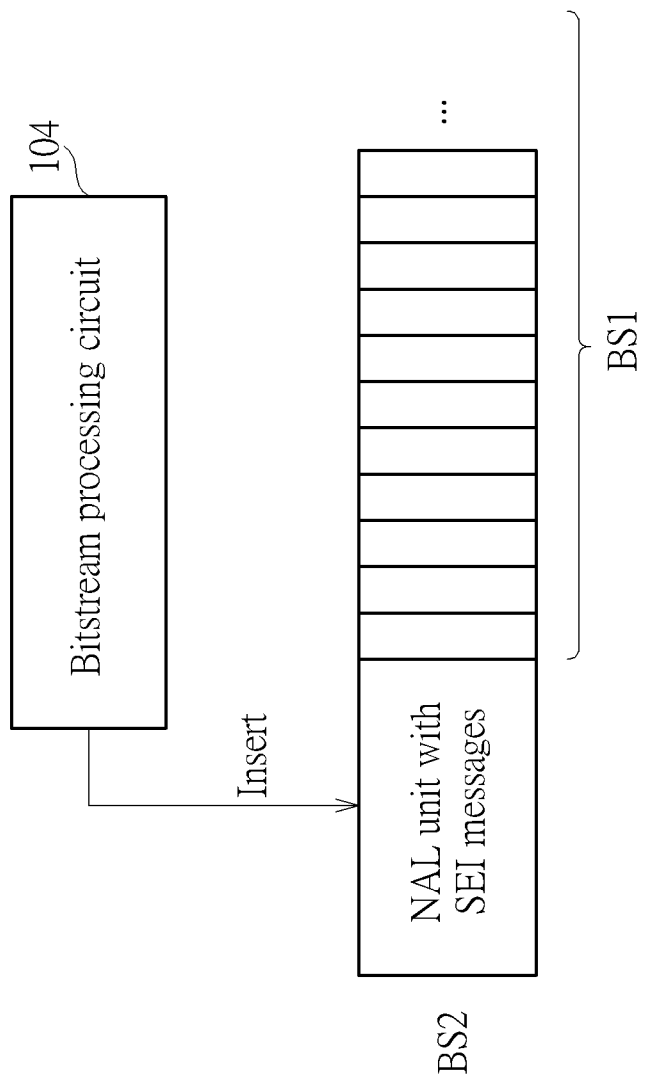
FIG. 13 is a diagram illustrating a Network Abstraction Layer (NAL) unit with supplemental enhancement information (SEI) messages that is inserted for supporting a Scalable Video Coding (SVC) standard according to an embodiment of the present invention.

FIG. 13 is a diagram illustrating a Network Abstraction Layer (NAL) unit with supplemental enhancement information (SEI) messages that is inserted for supporting the SVC standard according to an embodiment of the present invention. The bitstream processing circuit 104 produces an NAL Unit (with NAL unit type=6) that includes SEI message syntaxes, and this NAL unit is inserted before the first bitstream BS1 generated by the video encoder 102. For example, the SEI message indicates the number of hierarchical layers presented in the bitstream, the frame-resolution information of each layer, the frame rate information of each layer, and/or the bit-rate information of each layer.

Figure 14:
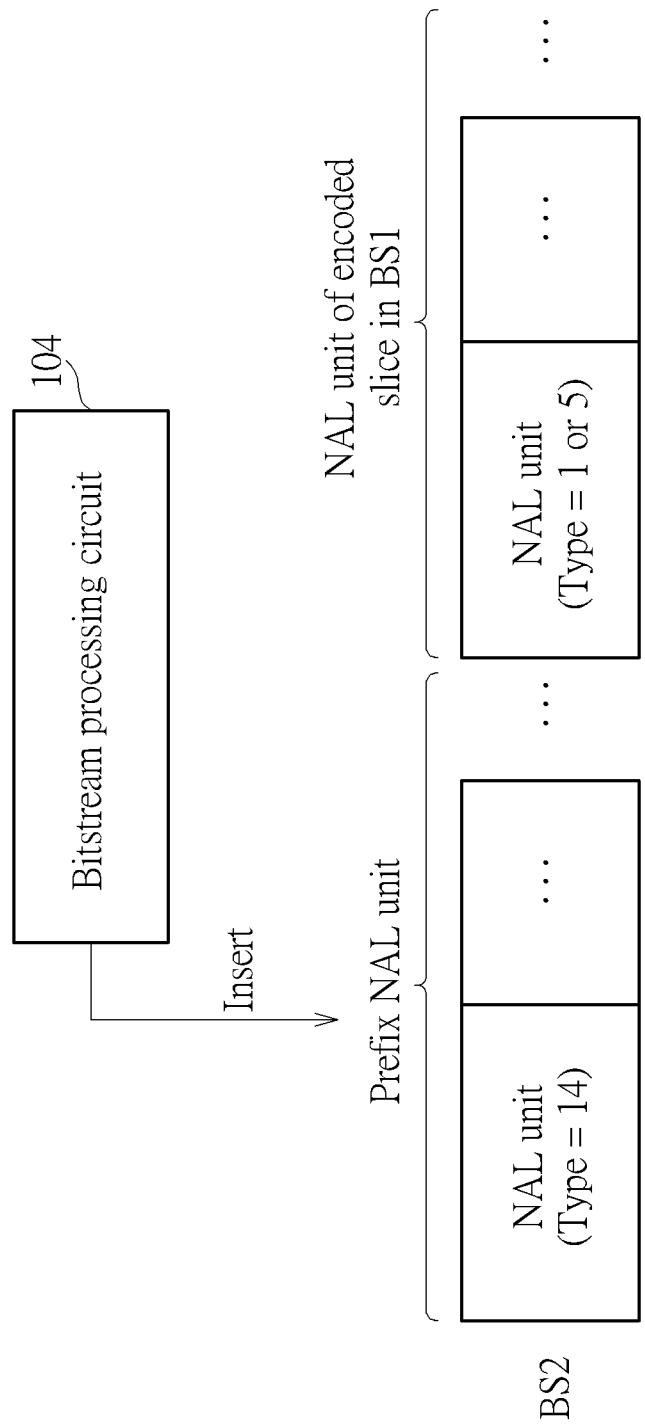
FIG. 14 is a diagram illustrating a Prefix NAL unit that is inserted for supporting the SVC standard according to an embodiment of the present invention.

FIG. 14 is a diagram illustrating a Prefix NAL unit that is inserted for supporting the SVC standard according to an embodiment of the present invention. The bitstream processing circuit 104 produces a Prefix NAL unit (with NAL unit type=14), and this Prefix NAL unit is inserted before each H.264/AVC NAL unit (with NAL unit type=1 or 5) of the encoded slice in the first bitstream BS1 generated by the video encoder 102. For example, each H.264/AVC NAL unit includes at least one slice header syntax, and the Prefix NAL unit includes a syntax element temporal id that specifies the hierarchy-level of the current slice.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video compression system comprising:
a video encoder, wherein the video encoder is hardware arranged to perform hardware video encoding upon a plurality of frames to generate a first bitstream, wherein the first bitstream is output from an entropy encoding circuit of the video encoder, and is an original compression output of the plurality of frames; and
a bitstream processing circuit, arranged to perform a bitstream post-processing operation upon the first bitstream to produce a second bitstream that is different from the first bitstream, and output the second bitstream as a post-processed compression output of the plurality of frames, wherein the bitstream processing circuit generates the second bitstream by performing the bitstream post-processing operation upon the first bitstream after the first bitstream is output from the entropy encoding circuit of the video encoder;
wherein the hardware video encoding performed at the video encoder is independent of the bitstream post-processing operation performed at the bitstream processing circuit.

2. The video compression system of claim 1, wherein the bitstream post-processing operation performed by the bitstream processing circuit comprises modifying at least one bit of the first bitstream.

3. The video compression system of claim 1, wherein the bitstream post-processing operation performed by the bitstream processing circuit comprises removing at least one bit from the first bitstream.

4. The video compression system of claim 1, wherein the bitstream post-processing operation performed by the bitstream processing circuit comprises inserting at least one bit into the first bitstream.

5. The video compression system of claim 1, wherein the bitstream post-processing operation performed by the bitstream processing circuit comprises shifting a portion of the first bitstream by at least one bit.

6. The video compression system of claim 1, wherein a length difference between a bitstream length of the first bitstream and a bitstream length of the second bitstream is an integer multiple of 8.

7. The video compression system of claim 6, wherein the bitstream post-processing operation performed by the bitstream processing circuit comprises:
setting one or more redundant syntax elements; and
inserting said one or more redundant syntax elements between a second portion of the first bitstream and a first portion of the first bitstream.

8. The video compression system of claim 1, wherein the first bitstream comprises a header section, and the bitstream post-processing operation performed by the bitstream processing circuit is applied to the header section of the first bitstream.

9. The video compression system of claim 8, wherein the bitstream post-processing operation performed by the bitstream processing circuit comprises modifying reference picture list modification syntax in the header section.

10. The video compression system of claim 8, wherein the bitstream post-processing operation performed by the bitstream processing circuit comprises modifying decoded reference picture marking syntax in the header section.

11. A video compression method comprising:
performing, by a video encoder, hardware video encoding upon a plurality of frames to generate a first bitstream, wherein the video encoder is hardware arranged to perform the hardware video encoding, and the first bitstream is output from an entropy encoding circuit of the video encoder, and is an original compression output of the plurality of frames;
performing a bitstream post-processing operation upon the first bitstream to produce a second bitstream that is different from the first bitstream; and
outputting the second bitstream as a post-processed compression output of the plurality of frames;
wherein the second bitstream is generated by performing the bitstream post-processing operation upon the first bitstream after the first bitstream is output from the entropy encoding circuit of the video encoder; and
wherein the hardware video encoding is independent of the bitstream post-processing operation.

12. The video compression method of claim 11, wherein the bitstream post-processing operation comprises modifying at least one bit of the first bitstream.

13. The video compression method of claim 11, wherein the bitstream post-processing operation comprises removing at least one bit from the first bitstream.

14. The video compression method of claim 11, wherein the bitstream post-processing operation comprises inserting at least one bit into the first bitstream.

15. The video compression method of claim 11, wherein the bitstream post-processing operation comprises shifting a portion of the first bitstream by at least one bit.

16. The video compression method of claim 1, wherein a length difference between a bitstream length of the first bitstream and a bitstream length of the second bitstream is an integer multiple of 8.

17. The video compression method of claim 16, wherein the bitstream post-processing operation comprises:
setting one or more redundant syntax elements; and
inserting said one or more redundant syntax elements between a second portion of the first bitstream and a first portion of the first bitstream.

18. The video compression method of claim 11, wherein the first bitstream comprises a header section, and the bitstream post-processing operation is applied to the header section of the first bitstream.

19. The video compression method of claim 18, wherein the bitstream post-processing operation comprises modifying reference picture list modification syntax in the header section.

20. The video compression method of claim 18, wherein the bitstream post-processing operation comprises modifying decoded reference picture marking syntax in the header section.

* * * * *